United States Patent
Reddy et al.

(10) Patent No.: US 10,532,317 B2
(45) Date of Patent: Jan. 14, 2020

(54) REMOVAL OF METALS FROM CO2 CAPTURE SOLVENTS

(71) Applicant: Fluor Technologies Corporation, Sugar Land, TX (US)

(72) Inventors: Satish Reddy, Laguna Beach, CA (US); Joseph Yonkoski, Irvine, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 143 days.

(21) Appl. No.: 15/786,036

(22) Filed: Oct. 17, 2017

(65) Prior Publication Data

US 2018/0036681 A1 Feb. 8, 2018

Related U.S. Application Data

(62) Division of application No. 14/657,792, filed on Mar. 13, 2015, now Pat. No. 9,815,025.

(60) Provisional application No. 61/952,336, filed on Mar. 13, 2014.

(51) Int. Cl.
*B01D 53/14* (2006.01)
*B01D 53/96* (2006.01)

(52) U.S. Cl.
CPC ......... *B01D 53/96* (2013.01); *B01D 53/1425* (2013.01); *B01D 53/1475* (2013.01); *B01D 2252/204* (2013.01); *B01D 2258/0283* (2013.01); *Y02C 10/04* (2013.01); *Y02C 10/06* (2013.01)

(58) Field of Classification Search
CPC ............ B01D 53/1425; B01D 53/1475; B01D 53/96; B01D 2252/204; B01D 2258/0283; Y02A 50/2342; Y02C 10/04; Y02C 10/06

USPC .... 96/234, 240, 243, 371; 95/187, 214, 236; 423/220, 228, 229
See application file for complete search history.

(56) References Cited

U.S. PATENT DOCUMENTS

| | | | |
|---|---|---|---|
| 4,051,230 | A | 9/1977 | Miyauchi |
| 4,624,839 | A | 11/1986 | Wolcott et al. |
| 4,871,468 | A | 10/1989 | Jeffrey |
| 6,409,802 | B1 | 6/2002 | Kyotani |
| 7,056,482 | B2 * | 6/2006 | Hakka ............... B01D 53/1475 423/228 |
| 7,550,123 | B2 * | 6/2009 | Temple .................. A61L 9/145 422/120 |
| H002287 | H | 12/2013 | Vitse et al. |
| 9,815,025 | B2 | 11/2017 | Reddy et al. |

(Continued)

FOREIGN PATENT DOCUMENTS

| | | |
|---|---|---|
| EP | 0148604 A1 | 7/1985 |
| EP | 0526100 A1 | 2/1993 |

(Continued)

OTHER PUBLICATIONS

Machine-generated English translation of KO 10-2014-0033981, published Mar. 2014.*
Internet Document "Chelating resin" (https://en.wikipedia.org/wiki/Chelating_resin), (2018).*

(Continued)

*Primary Examiner* — Frank M Lawrence, Jr.
(74) *Attorney, Agent, or Firm* — Conley Rose, PC

(57) ABSTRACT

Corrosion in a CO2 removal system is reduced or even entirely avoided by use of a metal ion chelator unit that removes metal ions, and especially iron ions from an amine solvent to a level of equal or less than 1 mg/l without substantially binding heat stable salts.

20 Claims, 3 Drawing Sheets

(56) References Cited

U.S. PATENT DOCUMENTS

| | | |
|---|---|---|
| 2004/0253159 A1 | 12/2004 | Hakka et al. |
| 2009/0205496 A1 | 8/2009 | Idem et al. |
| 2011/0244555 A1 | 10/2011 | Gunther |
| 2011/0311429 A1 | 12/2011 | Liu et al. |
| 2012/0235087 A1 | 9/2012 | Handagama et al. |
| 2013/0333568 A1 | 12/2013 | Bockman et al. |
| 2014/0367612 A1 | 12/2014 | Mao et al. |
| 2015/0258497 A1 | 9/2015 | Reddy et al. |

FOREIGN PATENT DOCUMENTS

| | | | |
|---|---|---|---|
| GB | 2135900 A | | 9/1984 |
| KR | 10-2014-0033981 | * | 3/2014 |
| WO | 8502555 A1 | | 6/1985 |
| WO | 2009065218 A1 | | 5/2009 |
| WO | 2012125894 A2 | | 9/2012 |
| WO | 2013049896 A1 | | 4/2013 |
| WO | 2015138940 A1 | | 9/2015 |

OTHER PUBLICATIONS

International Application No. PCT/US2015/020510, International Search Report and Written Opinion, dated May 28, 2015, 14 pages.
U.S. Appl. No. 14/657,792, Restriction Requirement, dated Apr. 18, 2016, 7 pages.
U.S. Appl. No. 14/657,792, Office Action, dated Jun. 14, 2016, 10 pages.
U.S. Appl. No. 14/657,792, Final Office Action, dated Oct. 18, 2016, 9 pages.
U.S. Appl. No. 14/657,792, Advisory Action, dated Jan. 23, 2017, 3 pages.
U.S. Appl. No. 14/657,792, Office Action, dated Mar. 14, 2017, 9 pages.
U.S. Appl. No. 14/657,792, Notice of Allowance, dated Jul. 7, 2017, 8 pages.
International Application No. PCT/US2015/020510, International Preliminary Report on Patentability, dated Sep. 13, 2016, 9 pages.
Reddy, Satish et al., "Removal of Metals From CO2 Capture Solvents," filed Mar. 13, 2014, U.S. Appl. No. 61/952,336.

* cited by examiner

REMOVAL OF METALS FROM CO2 CAPTURE SOLVENTS

This application is a divisional of and claims priority benefit under 35 U.S.C. § 121 to U.S. patent application Ser. No. 14/657,792 filed on Mar. 13, 2015, now U.S. Pat. No. 9,815,025, and entitled "Removal Of Metals From CO2 Capture Solvents" which claims priority to U.S. Provisional Patent Application Ser. No. 61/952,336, filed on Mar. 13, 2014 and entitled "Removal of Metals From CO2 Capture Solvents", both of which are incorporated herein by reference in their entirety.

FIELD OF THE INVENTION

The field of the invention is corrosion prevention, especially as it relates to corrosion of stainless steel components in CO2 absorption systems.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art. Priority documents and publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply CO2 capture from various flue gases is well known in the art, and numerous solvents are suitable for such capture. Most typically, chemical solvents, and especially amine-based solvents have become routine reagents. Unfortunately, amine-based solvents are susceptible to reacting with oxygen in the presence of metal ions, and particularly iron, and metal catalyzed degradation of the amine-based solvents is commonly observed. While not fully understood, it is generally believed that the iron involved in solvent degradation is derived from the carbon steel materials used in the construction of the CO2 removal equipment, possibly via complex formation with various amine compounds. To reduce such corrosion, inhibitors can be added to the solvent, and particularly well-known corrosion inhibitors include copper inhibitors.

Unfortunately, it has been found more recently that even though copper is a corrosion inhibitor, copper may also promote solvent degradation and formation of degradation products that may lead to severe corrosion of the CO2 removal equipment. As an alternative to using copper inhibitors, CO2 removal equipment may be constructed from stainless steel. However, most stainless steel construction is very expensive and thus generally disfavored. Nevertheless, in at least one instance, the inventors are aware of an installation where CO2 removal equipment had been constructed from stainless steel to avoid potential issues associated with iron leaching from carbon steel materials. Moreover, and because of the use of stainless steel, that installation also avoided use of copper inhibitors to so prevent any possibility of metal-catalyzed solvent degradation and corrosion of equipment. Quite unexpectedly, however, the stainless steel equipment was subject to corrosion.

Thus, there is still a need to provide systems, compositions, and methods to reduce or even eliminate corrosion of stainless steel components in CO2 removal systems, particularly where such systems are operated in the absence of copper inhibitors.

SUMMARY OF THE INVENTION

The present invention is directed to various configurations, devices, and methods of reducing corrosion in an amine-based CO2 removal system where metal ions that have leached from flyash are removed from the amine solvent using a metal ion chelator. So purified amine solvent is then reused in the absorption system.

In one aspect of the inventive subject matter, a CO2 removal system includes a CO2 absorber that is fluidly coupled via a solvent circuit to a regenerator, wherein the absorber is configured to receive a treated flue gas from a flue gas treatment system and to produce a CO2-lean treated flue gas. A metal removal system is further fluidly coupled to the solvent circuit and configured to receive a metal containing amine solvent from the solvent circuit and to provide a purified amine solvent to the solvent circuit, wherein the metal removal system comprises a metal ion chelator present in an amount sufficient to reduce ionic metals in the amine solvent flowing through the solvent circuit to equal or less than 1 mg/l. The amine solvent may or may not contain a copper inhibitor.

Further contemplated systems may include a solvent reclamation unit that is fluidly coupled to the solvent circuit. While not limiting to the inventive subject matter, wherein the absorber, regenerator, and/or the reclamation unit may be manufactured from stainless steel. Additionally, it is contemplated that the metal ion chelator preferentially or selectively binds iron, nickel, and/or chromium ions, and the metal ion chelator may be immobilized on a solid phase. It is further contemplated that the metal ion chelator chelates metals without substantially removing heat stable salts in the amine solvent.

Where desirable, the flue gas treatment system may include a particulate filtration unit, a direct contact condenser, a SOx reduction unit, and/or a NOx reduction unit, and the treated flue gas may comprise flyash at a concentration of less than 1 mg/Nm3 (STP) having a metal ion content of equal or less than 10 wt %.

Viewed from a different perspective, the inventors also contemplate a method of reducing corrosion in a CO2 removal system. Preferred methods will include a step of providing a treated flue gas (e.g., treated flue gas is obtained from a coal burning power plant) to an absorber (e.g., manufactured from or lined with stainless steel), and absorbing CO2 from the treated flue gas in the absorber with an amine solvent to produce a CO2-lean treated flue gas. In a further step, the amine solvent is processed with a metal ion chelator to reduce ionic metals in the amine solvent to equal or less than 1 mg/l without substantially removing heat stable salts in the amine solvent (e.g., removing less than 5%, and more typically less than 1% per contact with chelator). The so processed solvent is then recirculated to the absorber.

In certain contemplated aspects, the treated flue gas has been treated in a particulate filtration unit, a direct contact condenser, a SOx reduction unit, and/or a NOx reduction unit, and the treated flue gas comprises flyash at a concentration of less than 1 mg/Nm3 (STP) having a metal ion content of equal or less than 10 wt %. Where desired, the amine solvent may be passed through a solvent reclamation unit, and may or may not contain a copper inhibitor. With respect to the metal ion chelator it is contemplated that the chelator preferentially or selectively binds iron, nickel, and/or chromium ions. Moreover, the metal ion chelator may be immobilized on a solid phase.

Various objects, features, aspects and advantages of the present invention will become more apparent from the following detailed description of preferred embodiments of the invention.

DETAILED DESCRIPTION

Figure 1:
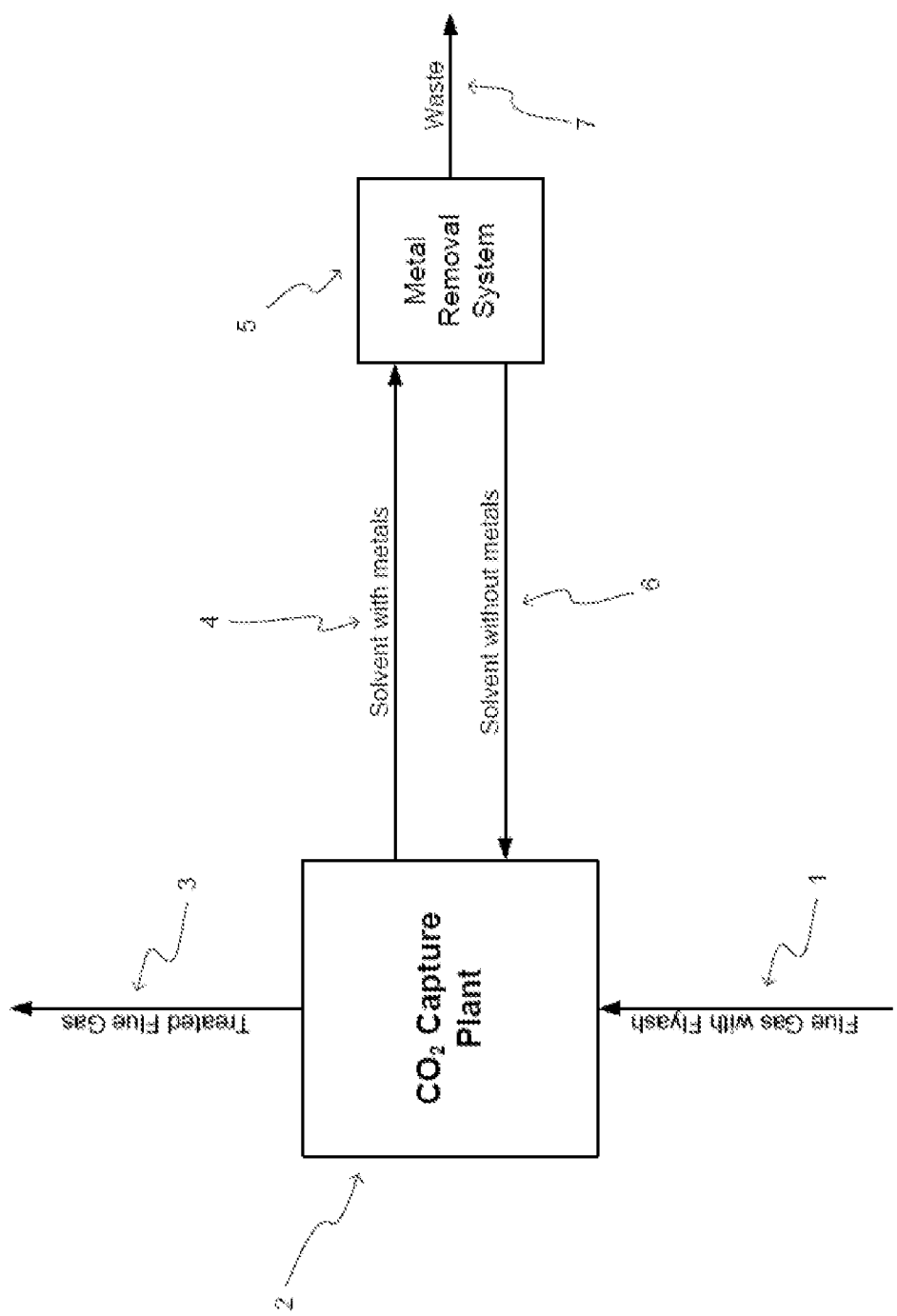
FIG. 1 is an exemplary schematic of a CO2 capture plant with a metal removal system according to the inventive subject matter.

The present invention is directed to the unexpected finding that residual flyash in treated flue gas comprises various amine solvent-leachable metal ions, particularly iron ions ($Fe^{2+/3+}$), nickel ions ($Ni^{2+}$), and/or chromium ions ($Cr^{2+/3+/5+}$), and that these solvent-leachable metal ions contribute to corrosion damage of the stainless steel equipment as well as solvent degradation. Such finding is especially unexpected as the treated flue gas is already compliant with emission regulations for particulate content. In most cases, treated flue gas has already been subjected to a particulate removal step (e.g., bag house, electrostatic precipitator, etc.) and a direct contact condensation step with aqueous solutions using co- or counter-current washing.

As solution to such problems, the inventors contemplate a retrofit or de novo installation of a metal ion chelation unit in flue gas treatment units where the previously treated flue gas is subjected to CO2 removal and where at least part of such flue gas treatment units (e.g., amine absorber and/or regenerator) are constructed from or lined with stainless steel. It is still further preferred that the metal removal system will include a chelation unit that has an immobilized chelator that chelates iron ions, nickel ions, and/or chromium ions. The chelator, once loaded, can then be regenerated or discarded as best suitable. Notably, such metal removal systems will not be affected by the presence of heat stable salts, and/or competitive binding of heat stable salts that could otherwise reduce binding capacity for the amine solvent-leachable metal ions. Viewed from another perspective, it should be appreciated that metal removal systems contemplated herein will not operate as ion exchangers as is conventional in reclamation units to remove heat stable salts, but to specifically and selectively remove metal ions that will contribute to solvent degradation and formation of products that lead to corrosion of stainless steel. Contemplated metal removal systems can be used in combination with a conventional solvent reclamation unit, or alone, and may operate on the entire solvent flow or only on a portion thereof.

Although post-combustion CO2 capture is now known for decades, experience capturing CO2 from coal flue gases has been relatively minimal, and capture of CO2 from coal flue gas will be necessary to curb global CO2 emissions. Recent capture experience with coal flue gases has identified new problems that were not foreseen, particularly the contamination of the CO2 capture solvent from constituents in the coal flue gas and attendant corrosion problems. Notably, the inventors have now discovered that residual quantities of micron-sized and submicron-sized coal ash, or flyash, present in the coal flue gas are absorbed by the CO2 capture solvent, and that metals from the flyash can leach into the solvent, catalyze its degradation, and lead to corrosion of the stainless steel equipment. Such is particularly unexpected as the quantities of the residual flyash are already at considerably low levels, typically below 1.0 mg/$Nm^3$ (STP, dry, 6% O2), and as such particles are relatively small (typically 90% of the flyash particles are less than 2.5 micrometers in the largest dimension) and only have a minor fraction of metal ions (typically 1-10 wt % of iron as $Fe_2O_3$).

In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

As exemplarily shown in FIG. 1, treated flue gas (1) from a flue gas treatment system of a coal power plant contains trace amounts of flyash, for example, 0.8 mg/$Nm^3$ (STP, dry, 6% O2), and enters a CO2 capture plant (2) comprising an absorber, a regenerator, and an optional solvent reclamation unit. Most typically, at least one of the absorber and the regenerator is a stainless steel absorber/regenerator. CO2 is absorbed by an amine solvent that also absorbs a significant fraction (e.g., >25%), or even the majority (e.g., >50%) of the flyash. The so formed CO2-lean treated flue gas (3) is released to the atmosphere, while at least some (e.g., 10%) of the metals contained in the flyash leach in ionic form into the amine solvent. The solvent with dissolved metals (4) is sent to a Metal Removal System (5) where metals in the solvent bind to a chelating resin and are removed from the solvent. It should be noted that the Metal Removal System 5 may be configured to receive rich solvent, or more preferably lean solvent from the regenerator and/or solvent reclamation unit. The so purified solvent (6, solvent without metals) is returned to the process and continues to capture CO2 in the CO2 capture plant (2). The metals that are bound to the chelating resin in the Metal Removal System (5) are typically eluted from the resin by chemical means and are concentrated in a waste stream (7), and the regenerated resin continues to capture dissolved metals. Alternatively, the metal-loaded chelating resin may also be disposed of in a suitable manner.

Figure 2:
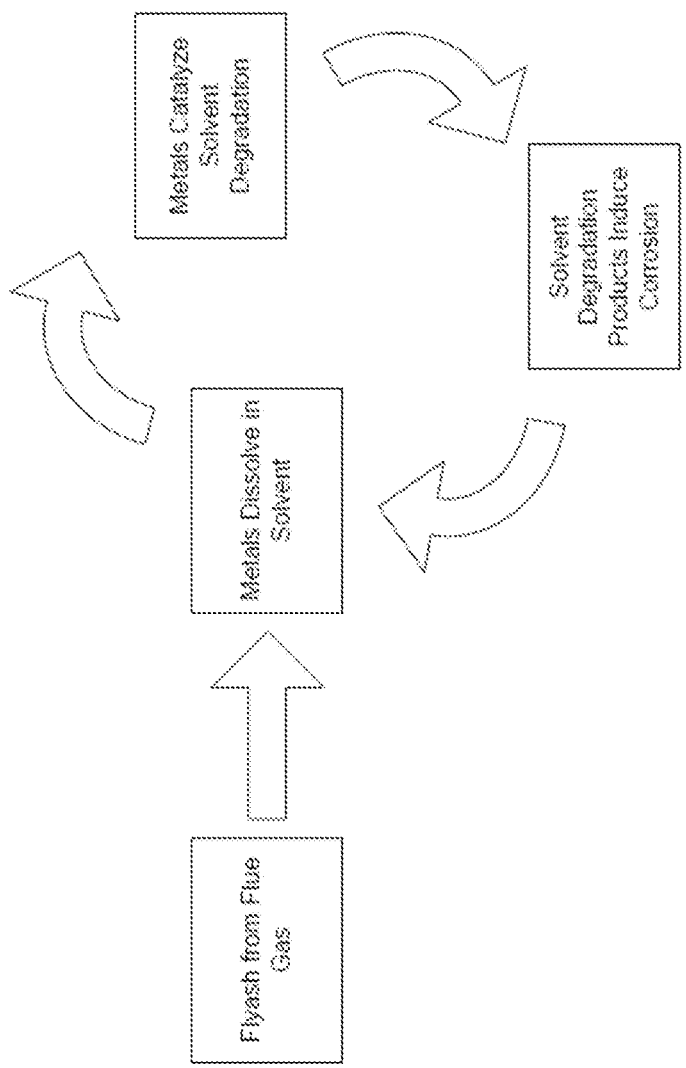
FIG. 2 is an exemplary schematic illustrating metal corrosion cycle induced by metals leached from flyash.

FIG. 2 schematically shows an autocatalytic degradation process that typically exists in CO2 capture plants that treat coal flue gas without a metal removal system contemplated herein. Flyash, present in low levels (typically 0.1-1.0 mg/$Nm^3$, STP, dry, 6% $O_2$) in coal flue gases, is captured in a CO2 capture plant solvent, and a portion of the metals present in the flyash dissolve into the solvent and exist as ions (e.g. $Fe^{3+}$). These metal ions now catalyze the degradation of the CO2 capture solvent (typically an amine solvent). Among other elements, metals that tend to leach from flyash in ionic form and tend to induce amine solvent degradation particularly include iron, nickel, chromium, vanadium, and copper. Upon reaching sufficiently high levels of solvent degradation, certain degradation products in the solvent are thought to result in corrosion of the equipment, leading to release of more metal ions from the equipment into the solvent. It should be noted that such a cycle will continue to compound in a run-away type reaction sequence, and that solvent losses and plant corrosion will likely be extensive. Notably, such corrosion will even occur in plants where the absorber and/or regenerator are lined with or made from stainless steel. In addition, it should be noted that corrosion due to degradation products may also occur in the presence of corrosion inhibitors (e.g., copper ions).

Without the use of a metal removal system, the capacity of a solvent reclaiming system would need to be undesirably large to maintain a low level of degradation products in the solvent. Moreover, it should also be appreciated that the use of a reclaiming system alone is not deemed to be sufficient to maintain low metal levels in the solvent (e.g., <1 mg/l). In fact, it should be appreciated that conventional ion exchange systems cannot remedy these problems, even though they are reported and known to reduce metal ionic species to at least some degree. Among other factors, upon solvent degradation, heat stable salts and other charged degradation products are in substantial molar excess over the quantities of metal ions required to kick off a degradation cycle as mentioned above. Thus, ion exchange resins are quickly burdened with heat stable salts and other charged degradation products and will have less or insufficient capacity to bind and reduce metal ion levels to those that reduce or avoid a solvent degradation cycle (e.g., equal or less than 2 mg/l, more typically equal or less than 1 mg/l, most typically equal or less than 0.5 mg/l).

Thus, and viewed from another perspective, it should be recognized that once a metal catalyzed degradation cycle has begun, conventional ion exchange resins will not provide sufficient protection from accelerated solvent degradation and corrosion, even where stainless steel equipment is employed. Similarly, it should be recognized that even with metal-free solvent systems (e.g., systems without copper inhibitors) operating in stainless steel equipment, residual flyash will eventually provide for sufficient quantities of metal ions, and especially iron ions to initiate solvent degradation and equipment corrosion.

Figure 3:
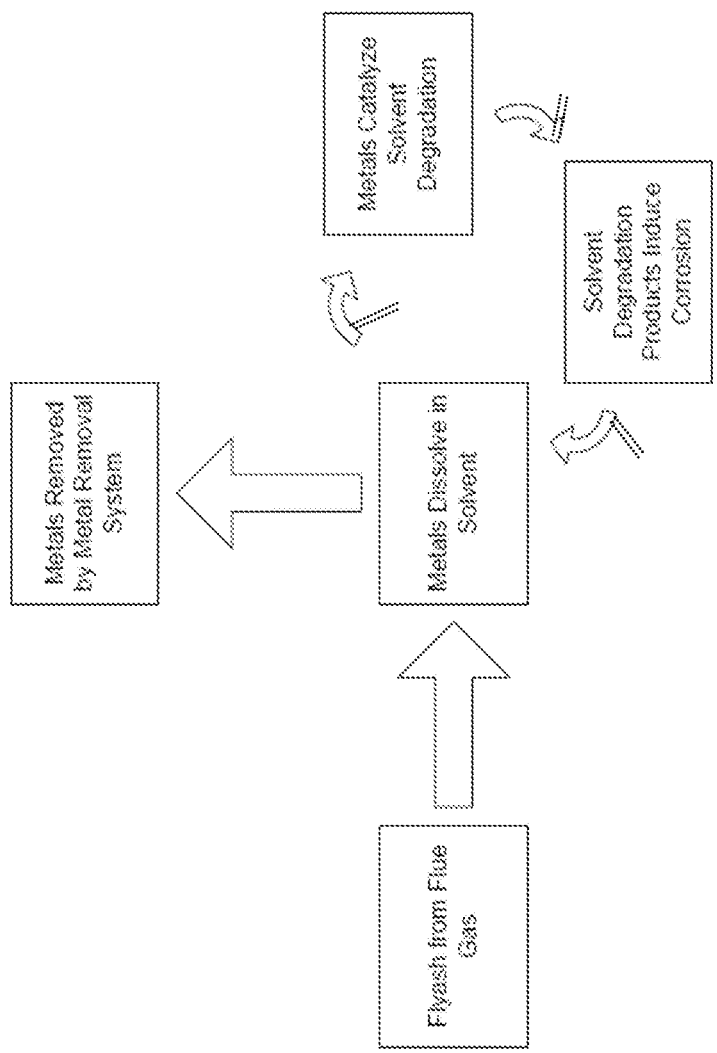
FIG. 3 is an exemplary schematic illustrating a solution to the metal corrosion cycle of FIG. 2.

FIG. 3 shows the same schematic autocatalytic process, however, now in the presence of contemplated metal ion chelation as discussed above. In this scenario, dissolved metals in the solvent from flyash leaching are removed by the Metal Removal System. Because the dissolved metal levels remain very low (e.g., <1 mg/l, or <0.7 mg/l, or <0.5 mg/l, or <0.2 mg/l, or <0.1 mg/l), attendant solvent degradation is reduced, and corrosion of plant steel from the degradation products is reduced or even eliminated. Moreover, where the metal removal system is employed, the solvent reclaiming system can be sized with a lower capacity (e.g., having 90%, or 85%, or 75%, or even less of the capacity otherwise required without metal removal system) and will still be sufficient to maintain a low level of degradation products in the solvent. As noted earlier, it should be noted that the primary target for the metal removal is ionic iron but removal of nickel, chromium, vanadium and copper ions is also deemed to be beneficial (indeed, the removal of any dissolved metal is ideal).

Therefore, it is especially contemplated that corrosion in an absorber and/or regenerator, and particularly in a stainless steel absorber and/or regenerator, can be reduced or eliminated by reducing or maintaining metal ion levels at concentrations of <1 mg/l, or <0.7 mg/l, or <0.5 mg/l, or <0.2 mg/l, or <0.1 mg/l in the presence or absence of amine solvent degradation products and/or heat stable salts. Moreover, it should also be noted that such reduced corrosion can be achieved in the absence of copper as corrosion inhibitor.

It should also be recognized that contemplated systems and methods are suitable for all known CO2 removal units operating with amine solvents, and especially for systems that use stainless steel, do not use copper inhibitors, and/or have a solvent reclamation unit (which can be advantageously reduced in size or capacity). Consequently, all amine-based chemical solvents are deemed appropriate for use herein, and exemplary solvents include simple amine solvents and sterically hindered amine solvents, including monoethanolamine (MEA), diglycolamine (DGA), diethanolamine (DEA), diisopropanolamine (DIPA), methyldiethanolamine (MDEA), piperazine, 2-methyl-piperazine, 1-methyl-piperazine, 2-amino-2-methyl-propanol, 2-piperidine-ethanol, and 1,4-dimethylpiperazine, etc, and all reasonable combinations thereof.

It is also contemplated that the solvent that is subjected to treatment by the metal removal system may be continuously or discontinuously treated in smaller fractions, or that the metal removal system is fluidly coupled to the regenerator, absorber, and/or reclamation unit to thereby treat substantially all of the flowing solvent. Thus, the metal removal system may receive a batch, a smaller stream, or the entire flowing solvent during operation, and may be continuously or intermittently operated. Viewed from a different perspective, the metal removal system may be coupled to the CO2 capture plant such that the metal removal system receives a CO2 rich solvent (e.g., from the absorber), a CO2 lean solvent (e.g., from the regenerator), or a processed CO2 lean solvent (e.g., from the reclamation unit). Therefore, the purified solvent may be routed to the absorber, the regenerator, and/or the reclamation unit.

It is also contemplated that the metal removal system will comprise one or more chelators that are preferably bound to a solid phase or are otherwise immobilized or held separate from the chemical solvent (e.g., via ion selective membranes, filtration units, etc.). For example, suitable chelators include monodentate, bidentate, tridentate, tetradentate, and higher order chelators that chelate (in a manner other than ion exchange, typically via formation or presence of coordinate bonds between a dentate ligand and the metal ion) one or more metal ions. Furthermore, it is also contemplated that the metal removal system is configured to chelate the metal ions directly (e.g., via the immobilized chelator), or indirectly (e.g., by binding or sequestration of chelators that have chelated metal ions).

Suitable chelators include those that chelate various $Me^{n+}$ (metal cations) and especially iron (e.g., $Fe^{2+}$, $Fe^{3+}$), nickel ($Ni^{2+}$), chromium (e.g., $Cr^{2+}$, $Cr^{3+}$, $Cr^{5+}$), vanadium (e.g., $V^{2+}$, $V^{3+}$, $V^{4+}$, $V^{5+}$), and/or copper (e.g., $Cu^{+}$, $Cu^{2+}$). As already noted before, it is generally preferred that the chelators will preferentially (e.g., molar binding ratio at least 10-fold for binding metal ions over heat stable salts and/or solvent degradation products), and more typically selectively (e.g., molar binding ratio at least 100-fold for binding metal ions over heat stable salts and/or solvent degradation products) chelate metal cations as compared to heat stable salts and/or solvent degradation products. Viewed from another perspective, it is also contemplated that preferred chelators do not substantially bind heat stable salts (i.e., bind less than 10%, or less than 5%, or less than 2% of heat stable salts in a single pass of solvent). Also, suitable chelators will have at least a preference (e.g., binding of one metal over another at a ratio of at least 3:1), and more typically selectivity (e.g., binding of one metal over another at a ratio of at least 10:1) against one or more metal ions, and most preferred chelators will preferentially chelate iron, or iron and nickel, or iron, nickel, and chromium ions. Such selectivity may be a compound selectivity of different chelators that are combined on a single carrier, or a mixture of different carriers having different binding preference or binding selectivity.

Exemplary chelating groups will therefore include hydroxyethylidene diphosphonic acid (HEDP), diethylene triamine penta acetic acid (DTPA), diethylenetriamine penta (methylene phosphonic acid) (DTPMP), cyclohexane 1,2-diamino tetra(acetic acid) (COTA), cyclohexane 1,2-diamino tetra(methylene phosphonic acid) (CDTMP), ethyleneglycol bis nitrilotetracetic acid (EGTA), hexamethylenediamine tetraacetic acid (HMDTA), nitrilo triacetic acid (NTA), citric acid, hydroxy ethylidene diphosphonic acid, 2-phosphonobutane-1,2,4-tricarboxylic acid (PBTCA), 2-hydroxy-2-phosphono-acetic acid (HPAA), diethylenetriamine penta acetic acid, hexamethylenediamine tetra(acetic acid), Bis(hexahethylene triamine penta acetic acid, amino trimethylene phosphonic acid, ethylenediamine tetra (methylene phosphonic acid), diethylenetriaminepenta (methylene phosphonic acid), hexamethylenemiamine tetra (methylene phosphonic acid), Bis(hexamethylene triamine penta (methylene phosphonic acid), and ethylenediamine disuccinic acid (EDDS). Of course, it should be noted that the chelators may be discarded once the chelators have reached chelating capacity, or may be regenerated following regeneration protocols known for such chelators.

Most typically, the flue gas that is subjected to the $CO_2$ removal is a treated flue gas that has undergone at least one and more typically two clean-up steps, and especially contemplated clean-up steps for the flue gas include direct contact condensation with an aqueous medium, $SO_x$ and/or $NO_x$ removal, typically using an aqueous caustic wash step, and one or more particulate removal steps (e.g., filtration using candle-type filters, electrostatic precipitators, cyclone separators, etc.). While the flue gas is typically a combustion gas from a carbonaceous material, flue gas from coal combustion is particularly preferred. Thus, upstream components for $CO_2$ capture plant will typically include a furnace or power plant that is configured to combust a carbonaceous fuel, and especially coal, gaseous, and/or liquid hydrocarbon fuels. The so produced flue gas is then subjected to one or more flue gas treatment systems as described above (e.g., direct contact condenser, $SO_x/NO_x$ removal unit, particulate removal system, etc.) to so produce the treated flue gas.

Depending on the particular type of fuel, the flyash content and composition may vary to at least some degree. However, regardless of the type of fuel used, it should be appreciated that the residual flyash in the treated flue gas is in most cases compliant with current US emission regulations for particulate and/or flyash emission. For example, fly ash present in contemplated treated flue gas commonly ranges from 0.1-1.0 $mg/Nm^3$ (STP, dry, 6% $O_2$), will typically contain 1-10 wt % of iron as $Fe_2O_3$, and have an average largest dimension of equal or less than 2.5 micrometers. Therefore, contemplated treated flue gas will have a flyash content of 0.05-0.1 $mg/Nm^3$, 0.1-0.5 $mg/Nm^3$, 0.5-1.0 $mg/Nm^3$, or 0.1-1.0 $mg/Nm^3$ (all STP, dry, 6% $O_2$). Viewed from a different perspective, fly ash will be present in contemplated treated flue gas in an amount of up to 0.1 $mg/Nm^3$, up to 0.5 $mg/Nm^3$, or up to 1.0 $mg/Nm^3$ (all STP, dry, 6% $O_2$). In most cases, the treated flue gas will be at or near atmospheric pressure (e.g., 1 atm, $^+/_-1$ bar) and the flyash will have a metal content of equal or less than 20 wt %, or equal or less than 10 wt %, or equal or less than 7 wt %, or equal or less than 5 wt %, or even less. Thus, a typical flyash metal content will be between 1-5 wt %, or between 1-10 wt %, or between 2-20 wt %.

Thus, specific configurations, systems, and methods of corrosion reduction in stainless steel $CO_2$ absorption systems have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A $CO_2$ removal system, comprising:
   a $CO_2$ absorber that is fluidly coupled via a solvent circuit to a regenerator, wherein the absorber is configured to receive a treated flue gas from a flue gas treatment system and to produce a $CO_2$-lean treated flue gas;
   a metal removal system fluidly coupled to the solvent circuit;
   wherein the metal removal system is configured to receive a metal containing amine solvent from the solvent circuit and to provide a purified amine solvent to the solvent circuit; and
   wherein the metal removal system comprises a metal ion chelator chemically bonded to a solid phase and present in an amount sufficient to reduce ionic metals in the amine solvent flowing through the solvent circuit to equal or less than 1 mg/l.

2. The $CO_2$ removal system of claim 1, wherein the metal containing amine solvent contains dissolved metals.

3. The $CO_2$ removal system of claim 1, wherein the ionic metals in the purified amine solvent are equal or less than 1 mg/l.

4. The $CO_2$ removal system of claim 1, wherein the amine solvent does not contain a copper inhibitor.

5. The $CO_2$ removal system of claim 1, wherein the metal ion chelator selectively binds iron, nickel, and/or chromium ions.

6. The $CO_2$ removal system of claim 1, wherein the metal ion chelator chelates metals without substantially removing heat stable salts in the amine solvent.

7. A $CO_2$ removal system, comprising:
   a $CO_2$ absorber having a solvent circuit, wherein the absorber is configured to receive a treated flue gas from a flue gas treatment system and to produce a $CO_2$-lean treated flue gas;
   a metal removal system fluidly coupled to the solvent circuit;
   wherein the metal removal system is configured to receive a metal containing amine solvent from the solvent circuit and to provide a purified amine solvent to the solvent circuit; and
   wherein the metal removal system processes the metal containing amine solvent with a metal ion chelator chemically bonded to a solid phase and such that ionic metals in the purified amine solvent are equal or less than 1 mg/l.

8. The CO2 removal system of claim 7, wherein the metal containing amine solvent contains dissolved metals.

9. The CO2 removal system of claim 7, further comprising a solvent reclamation unit fluidly coupled to the solvent circuit.

10. The CO2 removal system of claim 9, wherein the metal containing amine solvent is received by the metal removal system in the form of a processed CO2 lean solvent obtained from the solvent reclamation unit.

11. The CO2 removal system of claim 7, further comprising that a regenerator fluidly coupled to the solvent circuit.

12. The CO2 removal system of claim 11, wherein the metal containing amine solvent is received by the metal removal system in the form of a CO2 lean solvent obtained from the regenerator.

13. The CO2 removal system of claim 7, wherein the absorber is manufactured from stainless steel.

14. The CO2 removal system of claim 7, wherein the amine solvent does not contain a copper inhibitor.

15. The CO2 removal system of claim 7, wherein the metal ion chelator selectively binds iron, nickel, and/or chromium ions.

16. The CO2 removal system of claim 7, wherein the metal ion chelator chelates metals without substantially removing heat stable salts in the amine solvent.

17. The CO2 removal system of claim 7, wherein the flue gas treatment system comprises a treatment system selected from a particulate filtration unit, a direct contact condenser, a SOx reduction unit, or a NOx reduction unit.

18. The CO2 removal system of claim 7, wherein the treated flue gas comprises flyash at a concentration of less than 1 mg/Nm$^3$ (STP) having a metal ion content of equal or less than 10 wt %.

19. A CO2 removal system, comprising:
a CO2 absorber that is fluidly coupled via a solvent circuit to a regenerator, wherein the absorber is configured to receive a treated flue gas from a flue gas treatment system and to produce a CO2-lean treated flue gas;
a metal removal system fluidly coupled to the solvent circuit;
wherein the metal removal system is configured to receive a metal containing amine solvent from the solvent circuit and to provide a purified amine solvent to the solvent circuit; and
wherein the metal removal system comprises a chelating resin present in an amount sufficient to reduce ionic metals in the amine solvent flowing through the solvent circuit to equal or less than 1 mg/l.

20. The CO2 removal system of claim 19, wherein the chelating resin comprises a metal ion chelator chemically bonded to a solid phase.

* * * * *